UNITED STATES PATENT OFFICE.

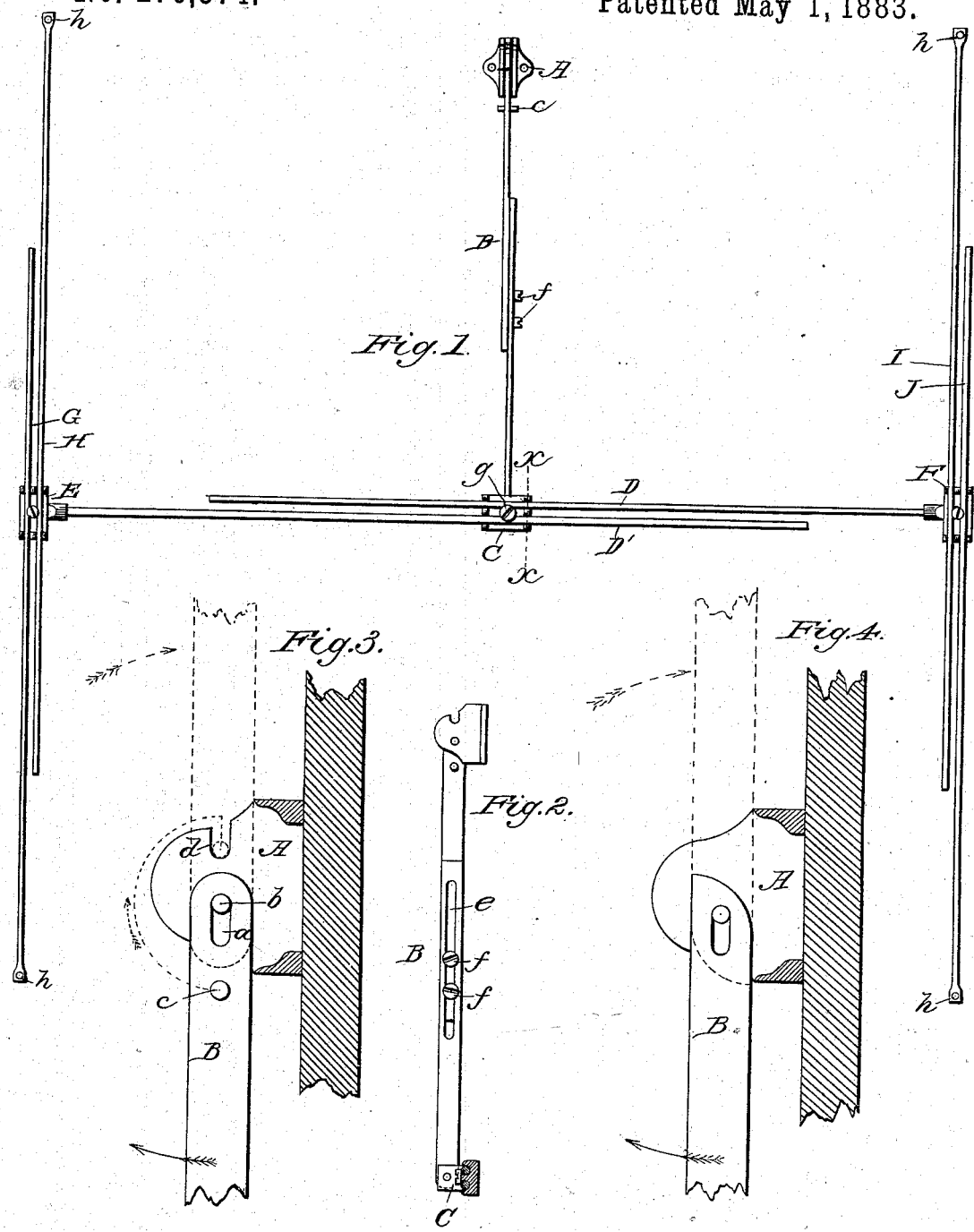

WILLIAM G. FOSTER, OF CHICAGO, ILLINOIS, ASSIGNOR OF ONE-HALF TO LEVERETT E. FITTS, OF SAME PLACE.

PILLOW-SHAM HOLDER.

SPECIFICATION forming part of Letters Patent No. 276,574, dated May 1, 1883.

Application filed March 19, 1883. (No model.)

*To all whom it may concern:*

Be it known that I, WILLIAM G. FOSTER, a citizen of the United States, residing at Chicago, county of Cook, and State of Illinois, have invented certain new and useful Improvements in Pillow-Sham Holders, of which the following is a specification.

My invention relates to improvements in pillow-sham holders, in which an individual frame is provided, and over which the sham is spread and removably attached, said frame being pivoted so as to lower the sham to its operative position, or elevate it out of the way of the occupant of the bed.

The objects of my invention are to provide a pillow-sham holder which may be attached to any ordinary bedstead, and which has its several parts so constructed as to be readily adjusted to shams varying in dimensions, said parts being so connected that they may be readily detached from each other and packed in a small compass for storage, and particularly for shipping. I attain these objects by devices illustrated in the accompanying drawings, in which—

Figure 1 is a front elevation of a pillow-sham holder embodying my invention; Fig. 2, a detail side elevation of the bracket and adjustable lever connecting the frame with the head-board of a bedstead, and taken on the line $x\ x$ of Fig. 1. Fig. 3 is an enlarged detail, partly in section, of the bracket and lever, the latter being shown by dotted lines, raised and locked in the bracket; and Fig. 4, a similar view of a modification of the same.

Similar letters of reference indicate the same parts in the several figures of the drawings.

A represents a bracket secured to the head-board or other suitable place upon a bedstead, and having pivoted thereto a lever, B, which is slotted, as shown at $a$, so as to have a shifting bearing on its pivot $b$, secured to the bracket. Lever B is also provided with a stud, $c$, at such a distance from the slot as will enable it to clear the outer end of the bracket when swinging the lever to a raised vertical position, (shown in dotted lines in Fig. 3,) the bracket being notched on its upper edge, at $d$, so that by shifting the lever on its bearing the stud $c$ will drop into the notch and lock the lever in its raised position. Instead, however, of the stud $c$ and notch $d$, the end of the lever may be elongated, as shown in Fig. 4, so that when in its elevated position and shifted on its bearing the then lower end of the lever will impinge against the bracket, as shown and indicated by dotted lines in Fig. 4. Besides providing for pivoting and locking in its raised position the sham-frame about to be described, this lever also provides for adjusting the frame toward or from the head-board of the bed, as desired, by being constructed in two parts, one overlapping the other, and having an elongated slot, $e$, through which set-screws $f$ pass and are secured in the other branch of the lever, so that by loosening the screws and sliding the parts one upon the other the length of the lever may be adjusted, and afterward held by tightening the screws.

Pivoted on the outer end of the lever is a plate, C, the parallel side flanges of which are each provided with two notches, the opposing notches forming bearings for two bars or rods, D D', respectively, arranged at a right angle to the lever and parallel to each other, and providing for a lateral adjustment of the sides of the frame, as clearly shown in Fig. 1, the rods D D' being rigidly but adjustably held by a set-screw, $g$, the head of which impinges against both bars, owing to their closeness together, and the shank of the screw passing between the bars and screwed into the plate, and the fact that the bars are confined in the notches.

Upon the outer extremity of each rod or bar D D' are rigidly and respectively secured plates E F, similar to the plate C, the plate E carrying two rods or bars, G H, and the plate F the rods or bars I J, these several rods being adjustable in precisely the same manner as but at a right angle to the rods D D', and are each flattened at their outer extremity and provided with eyes $h$ for convenience in attaching the sham by means of a thread, spring, or hook.

From the above-described construction it will be seen that the essential elements of my structure may be composed of straight rods or bars adapted to be bundled in a very small package for shipping, and which are cheap of construction, readily put together, and adapted to be adjusted to shams varying in length or width, or both, and to maintain the sham in a smooth condition when attached to the frame.

Pivoting the plate C to the lever B and the lever in turn to the bracket provides for raising the frame above its operative position without revolving or turning over the sham, which is an objectionable feature in many of the holders now in use. In other words, the frame has two pivotal movements—namely, one on the outer end of the lever and one on the pivot of the lever in the bracket, as clearly shown in Fig. 2.

Instead of notching the plates C E F, they may be provided with perforations corresponding in number and location with the notches, and other means than the set-screws may be provided for rigidly retaining the rods or bars when adjusted, and for attaching the sham to the holder, without departing from the spirit of my invention.

It may here be noted that each rod has two bearings, between which the set-screw or other clamping device operates, and that the effect of this construction is to provide for rigidly holding the rods against the possibility of accidental detachment when once adjusted.

Preferably the frame of the holder is constructed of rods or tubes on account of lightness, strength, and durability; but they may be of any other suitable material, as also the lever, which is shown to be of two flat metal bars.

The holder may be elevated above its operative position by taking hold of the lever or frame and swinging the lever on its pivot to the vertical position shown in dotted lines, in which position the slot in the lever and the notch in the bracket will be in alignment, and the gravity of the holder cause the lever to shift its fulcrum and the stud $c$ to drop in the notch $d$, or, as shown in Fig. 4, the end of the lever to drop below and engage its edge with the bracket, which in effect operates as a weight on the short arm of the lever.

To lower the sham-holder it is only necessary to lift the lever until disengaged, when the holder may be swung forward and downward to its operative position.

As a matter of fact, the holder in its operative position rests against the pillows, which are set edgewise, and, owing to the two pivotal movements which the holder has, it automatically adjusts itself to the angle at which the pillow or pillows are set.

Having described my invention, what I claim, and desire to secure by Letters Patent, is—

1. A pillow-sham holder having two pivot-bearings, one of which pivots has a shifting fulcrum, substantially as described.

2. In a pillow-sham holder, an adjustable lever or arm pivotally connecting the sham-supporting frame with the bedstead or other support, substantially as described.

3. In a pillow-sham holder, the combination, with the lever B, provided with the stud $c$ and an elongated bearing, of the bracket to which the lever is pivoted, said bracket being notched to receive the stud on the lever, substantially as and for the purpose described.

4. The combination, with the swinging lever and the notched plate mounted thereon, of the parallel rods adjustably clamped to said plate, and supporting the side pieces of the sham-frame, substantially as described.

5. A pillow-sham frame the sides of which are each composed of parallel rods mounted upon and adjustably secured to supporting-plates connected with each other, substantially as described.

6. The combination, with the pivoted lever, the pieces D D', and the side pieces of the frame, of the notched plates forming bearings for said pieces, and the set-screws clamping the several parts together, all substantially as described.

WILLIAM G. FOSTER.

Witnesses:
CHAS. G. PAGE,
W. W. ELLIOTT.